(12) United States Patent
Laskoski et al.

(10) Patent No.: US 7,772,355 B2
(45) Date of Patent: Aug. 10, 2010

(54) DIVINYLSILANE-TERMINATED AROMATIC ETHER-AROMATIC KETONE-CONTAINING COMPOUNDS

(75) Inventors: Matthew Laskoski, Springfield, VA (US); Teddy M Keller, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 396 days.

(21) Appl. No.: 12/020,623

(22) Filed: Jan. 28, 2008

(65) Prior Publication Data

US 2009/0192272 A1 Jul. 30, 2009

(51) Int. Cl.
*C08G 8/26* (2006.01)
(52) U.S. Cl. .......................... 528/127; 528/32; 525/393
(58) Field of Classification Search ............ 528/32, 528/127; 525/393
See application file for complete search history.

(56) References Cited

U.S. PATENT DOCUMENTS

| | | | |
|---|---|---|---|
| 4,183,874 A | 1/1980 | Fan et al. | |
| H000521 H | 9/1988 | Fan | |
| 4,816,496 A | 3/1989 | Wada et al. | |
| 5,272,237 A | 12/1993 | Keller et al. | |
| 5,292,779 A | 3/1994 | Keller et al. | |
| 5,512,376 A | 4/1996 | Brady et al. | |
| 5,824,744 A | 10/1998 | Gagne et al. | |
| 5,969,072 A | 10/1999 | Keller et al. | |
| 5,981,678 A | 11/1999 | Keller et al. | |
| 6,225,247 B1 | 5/2001 | Keller et al. | |
| 6,362,289 B1 | 3/2002 | Keller et al. | |
| 6,579,955 B2 | 6/2003 | Keller et al. | |
| 6,784,259 B2 | 8/2004 | Keller et al. | |
| 6,787,615 B2 | 9/2004 | Keller et al. | |
| 7,087,707 B2 | 8/2006 | Keller et al. | |
| RE039,332 E | 10/2006 | Keller et al. | |
| RE039,428 E | 12/2006 | Keller et al. | |
| 2007/0161770 A1 | 7/2007 | Keller et al. | |
| 2007/0161771 A1 | 7/2007 | Keller et al. | |

FOREIGN PATENT DOCUMENTS

WO 0212252 2/2002
WO 2004008251 1/2004

OTHER PUBLICATIONS

PCT Search Report and Written Opinion in PCT/US2009/032076.

*Primary Examiner*—Kuo-Liang Peng
(74) *Attorney, Agent, or Firm*—Amy L. Ressing; Joseph T. Grunkemeyer

(57) ABSTRACT

A compound having the formula:

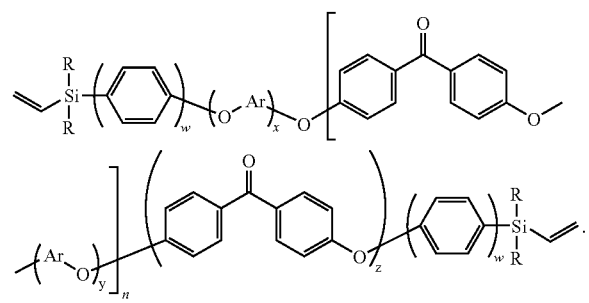

Each Ar is an aromatic group. Each R is an alkyl group. The value n is a positive integer. The values of w, x, y, and z are 0 or 1. If y is 0 than x and z are 0 and w is 1, and if y is 1 than x and z have different values and w equals z. A thermoset made by crosslinking a silane-containing compound with the above compound. A method of making the above compound when y is 1 by: reacting 4,4'-difluorobenzophenone with an aromatic diol to form an oligomer; and reacting the oligomer with a vinyl dialkylsilane. A method of making the below compound by: reacting 4,4'-difluorobenzophenone with a vinyl dialkylsilane. Each R is an independently selected alkyl group.

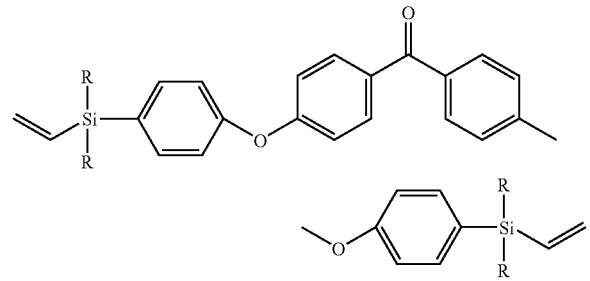

18 Claims, 1 Drawing Sheet

DIVINYLSILANE-TERMINATED AROMATIC ETHER-AROMATIC KETONE-CONTAINING COMPOUNDS

FIELD OF THE INVENTION

The invention is generally related to aromatic oligomers and products made therefrom.

DESCRIPTION OF RELATED ART

The rapid advancement of modern technology in recent years has increasingly demanded new high performance materials for use in a wide variety of engineering applications and under unusual service conditions. High temperature elastomers that have thermal, thermo-oxidative and hydrolytic stability above 300° C. (572° F.) and also maintain flexibility to well below ambient temperature may be suitable for numerous marine and aerospace applications. High temperature, tough elastomers may be suitable for high voltage electrical cables for advanced ships. Such elastomers may be suitable for components in high flying airplanes and space vehicles, which experience extreme variations of temperatures from as low as −50° C. to as high as 300-350° C. Such crosslinked elastomers or networked systems may also be suitable for high temperature integral fuel tank sealants, which require long lasting elastomers (up to 10,000 hours) for use from −60° C. to 400° C. without swelling on contact with jet fuels but with excellent adhesion and inertness toward metallic substrates.

SUMMARY OF THE INVENTION

The invention comprises a compound having the formula:

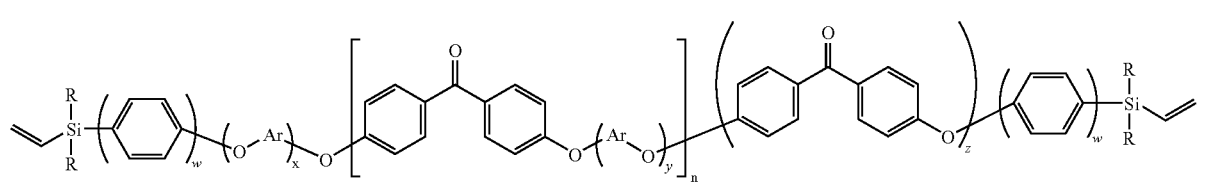

Each Ar is an independently selected aromatic group. Each R is an independently selected alkyl group. The value n is a positive integer. The values of w, x, y, and z are 0 or 1. If y is 0 than x and z are 0 and w is 1, and if y is 1 than x and z have different values and w equals z. The invention also comprises a thermoset made by crosslinking a silane-containing compound with the above compound.

The invention also comprises a method comprising: reacting 4,4'-difluorobenzophenone with an aromatic diol to form an oligomer; and reacting the oligomer with a vinyl dialkylsilane to form the above compound.

The invention also comprises a method comprising: reacting 4,4'-difluorobenzophenone with a vinyl dialkylsilane to form a compound having the below formula. Each R is an independently selected alkyl group.

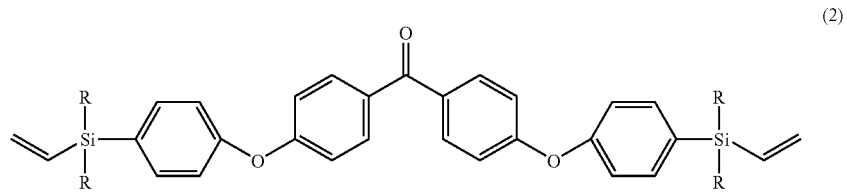

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
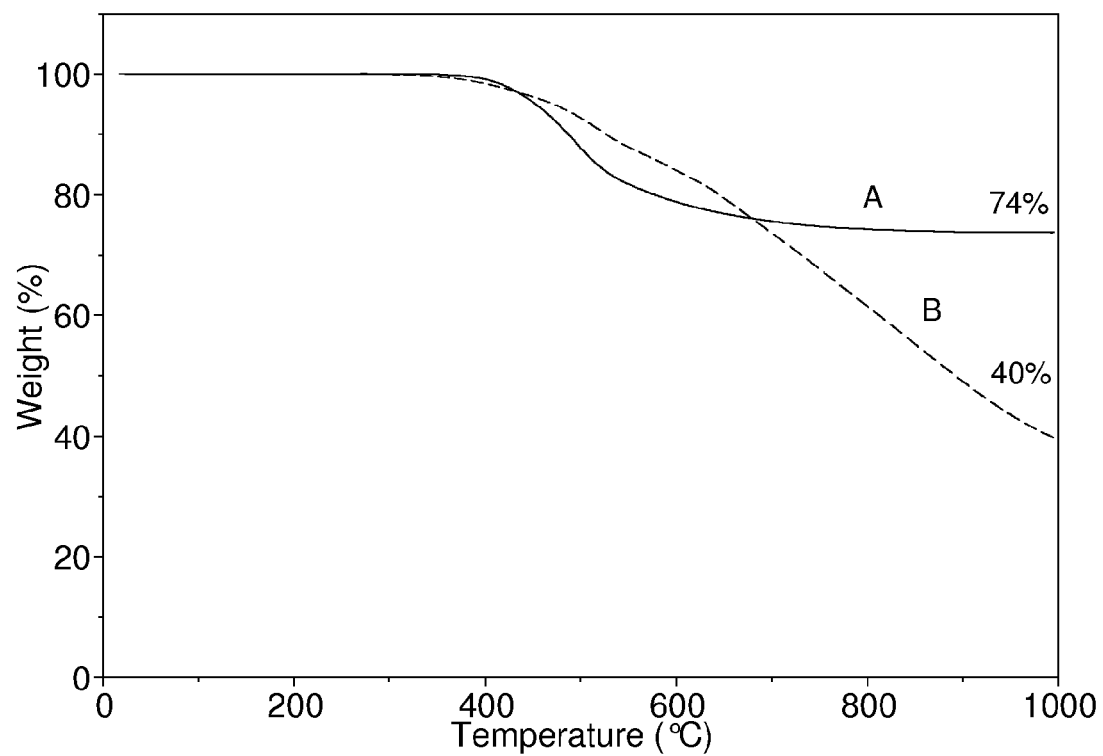
FIG. 1 shows TGA thermograms of a bisphenol A/benzophenone vinyl silane cured with CL-4 and postcured to 300° C. for 1 h. The resulting polymers were heated under (A) nitrogen (top) and (B) air (bottom).

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Efforts have been targeted towards developing high temperature elastomers and flame resistant composites and addressing composite processability issues based on cost effective manufacturing techniques such as resin transfer molding (RTM), resin infusion molding, and filament winding. The work has been concerned with the incorporation of units within the backbone to enhance the flammability resistance and thermo-oxidative properties while retaining low temperature processability. The liquid, low viscosity resin disclosed herein may enable the deposition of a coating onto a substrate by typical coating procedures and composite processing by RTM and resin infusion methods. Furthermore, a low melt viscosity and a larger processing window may be useful for fabrication of thick composite sections where the melt has to impregnate thick fiber preforms. Most other high temperature resins are not amenable to processing by cost effective methods such as RTM, resin infusion molding, and oven cure due to high initial viscosities, the evolution of volatiles during the cure, and or solvent-related problems.

The materials disclosed herein are related to the synthesis and polymerization of oligomeric divinyl-terminated aromatic ether-aromatic ketone-containing compounds, and their use as precursors to high temperature elastomers/coatings, plastics, and ceramics. High temperature, tough, and clear elastomers that can be processed under ambient conditions and that contain oligomeric aromatic ether-aromatic ketone units between the polymerization centers are not known to previously exist. These vinyl terminated units are interconnected by aromatic ether-aromatic ketone moieties with varying lengths to affect the physical properties. Since the divinyl terminated oligomers may be viscous liquids and may be soluble in most organic solvents, they can be fabricated into shaped elastomeric and plastic components or can be deposited onto fibrous materials as coatings in the presence of a curing additive. Polymerization can be achieved under ambient condition reaction of the ketone unit with the curing additive containing multiple—SiH units and by hydrosilation reactions involving the vinyl terminated units. The incorporation of the aromatic units within the backbone may enhance the stiffness, mechanical, thermal, and oxidative properties of the networked polymers fabricated from the materials.

The oligomeric aromatic ether-aromatic ketone-containing divinyl terminated monomers may be polymerized stepwise through the ketone units and through the terminated vinyl groups to afford high temperature, flame resistant thermosets. Depending on the amount of curing additive, elastomers or plastics may be obtained from the novel oligomers. Reaction of both reactive sites (vinyl and ketone units) may afford a highly crosslinked system. Polymeric coatings and composites formulated from the oligomeric aromatic ether-aromatic ketone-containing divinyl terminated monomers may have outstanding thermo-oxidative and flammability properties for military (ship, submarine, aerospace) and domestic applications and can withstand continuous high temperatures (300-375° C.) in oxidative environments such as air for extended periods. The use of low molecular weight precursor resins to obtain thermosetting polymeric materials with high thermo-oxidative properties may be advantageous from a processing standpoint. The precursor resins may be useful in composite fabrication by a variety of methods such as infusion, resin transfer molding and prepreg consolidation. With the new oligomeric monomers of the present invention, processability to clear coatings and shaped composite components can be achieved in non-autoclave conditions by cost effective methods.

One method for making the disclosed compounds is to react a 4,4'-difluorobenzophenone with an aromatic diol to form an oligomer. The oligomer may have any length and the reaction product will generally have more than one compound formed during the synthesis with the average molecular weight dependent on the ratios of reactants used. The mixture may also include a compound containing single repeat unit of one reactant and none of the other. The reaction may be a nucleophilic reaction in the presence of $K_2CO_3$, N,N-dimethylformamide (DMF), and toluene. This mixed solvent system allows the azeotropic distillation of the water formed as a by-product in the reaction at temperatures between 135 and 145° C. Either the aromatic diol or the 4,4'-difluorobenzophenone may be present in stoichiometric excess so that the oligomer is terminated by the excess reactant. Reaction with excess diol is shown in Eq. (3) and excess benzophenone is shown in Eq. (4). Suitable diols include, but are not limited to 4,4'-dihydroxy-2,2-diphenylpropane (bisphenol A); 1,1,1,3,3,3-hexafluoro-4,4'-dihydroxy-2,2-diphenylpropane (bisphenol A6F); biphenol, and resorcinol.

(3)

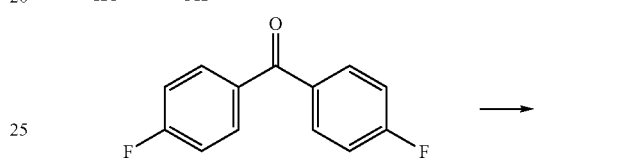

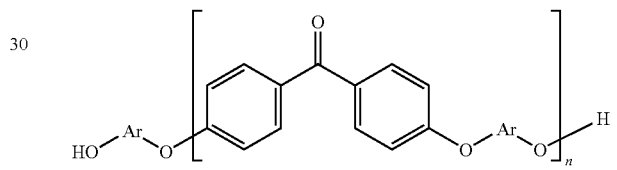

(4)

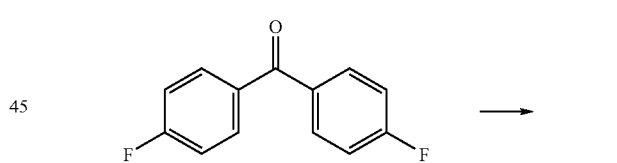

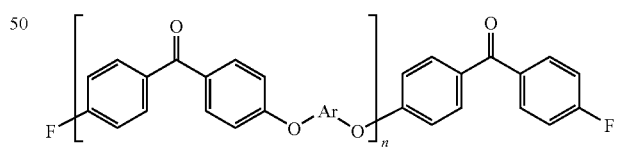

The oligomer may then be reacted with a vinyl dialkylsilane to add terminal vinyl silyl groups to the oligomer. When terminal diol is used, a chlorovinylsilane is used as in Eq. (5), and the reaction may be performed in the presence of triethylamine and THF. When terminal benzophenone is used, a vinylsilylphenol is used as in Eq. (6), and the reaction may be performed in situ with Eq. (4). Any unreacted benzophenone may also be vinylsilyl terminated as shown in Eq. (7). The possible combinations for the values of w, x, y, and z are (0, 1, 1, 0), (1, 0, 0, 0), and (1, 0, 1, 1).

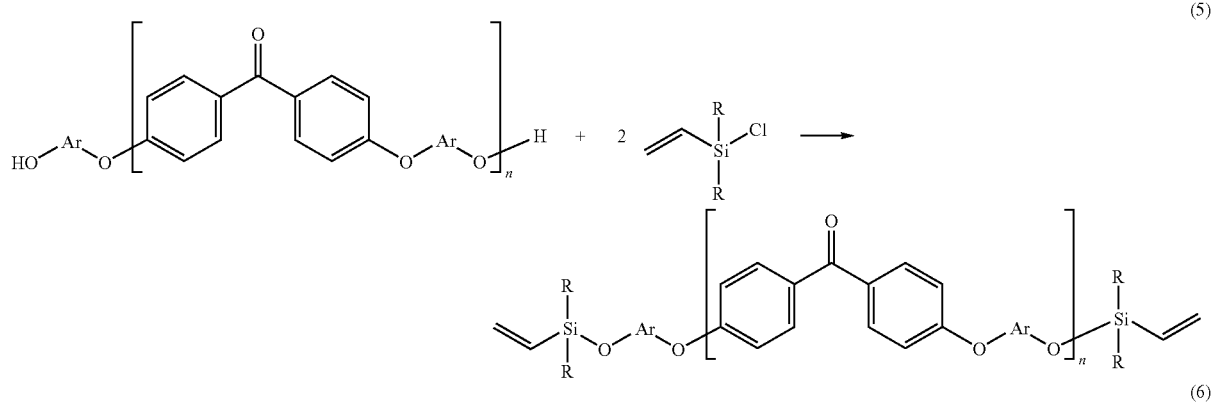

(5)

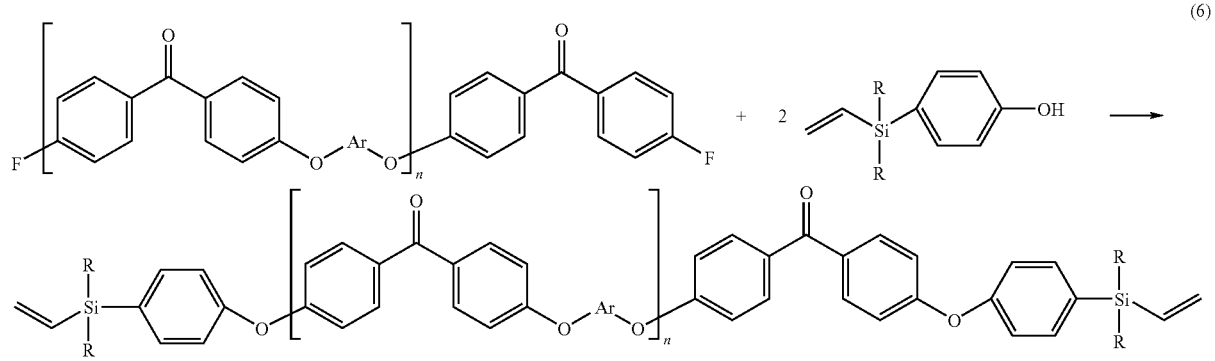

(6)

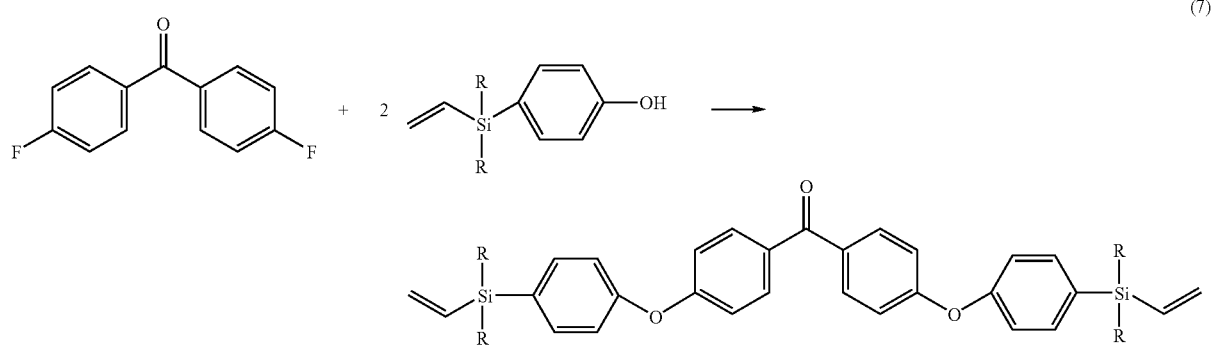

(7)

The reaction yields may be 91-95%. The vinyl-terminated oligomers of Eq. (1) may be readily soluble in common organic solvents such as toluene, DMF, acetone, methylene chloride, ether, and chloroform. The structure may be confirmed by IR and $^1$H-NMR spectroscopy. The length of the spacer between the terminal divinyl groups can be varied by changing the ratio between the diol and the benzophenone. The oligomeric divinyl resins may be clear liquids, which may enhance their importance for coating applications.

The reaction of the vinyl-terminated oligomers with any compound (curing additive) containing multiple SiH units may lead to a clear thermosetting polymer (elastomers and plastics). Thus, it is possible to tailor the cured polymer according to specific needs. Suitable curing additives include, but are not limited to, tetrakis(dimethylsiloxy)silane (CL-4); methyl tris(dimethylsiloxy)silane (CL-3 Me); phenyl tris(dimethylsiloxy)silane (CL-3 Ph); bis[(p-dimethylsilyl)phenyl]ether; diphenylsilane; 1,1,3,3-tetramethyldisiloxane (CL-2); 1,1,3,3,5,5,7,7-octamethyltetrasiloxane; and hydride-terminated polydimethylsiloxane. The thermoset may be made from more than one oligomer, including oligomers differing in the value of n. The crosslinked polymer may exhibit outstanding thermal and oxidative properties. FIG. 1 shows the thermograms of bisphenol A/benzophenone divinyl silane cured with CL-4 up to 100° C. and postcured to 300° C. for 1 h. The polymer was stable to temperatures in excess of 300° C. When heated to 1000° C. under a flow of nitrogen and air, the polymer showed weight retention of 74% and 40%, respectively (FIG. 1). The polymer displayed a weight retention in air that was superior to other highly aromatic systems.

Upon addition of the curing additive at room temperature, the ketone and vinyl groups may commence to react as shown in Eq. (8). The ketone group may be more reactive. A thermoset formed from reaction of both the ketone and the vinyl units with the silane groups would be highly crosslinked. Thus depending on the curing conditions and thermal parameters, high temperature thermosetting soft-to-hard rubber-to-plastic-to-carbon/ceramic composition may be obtained. Regardless of the curing conditions, the liquid oligomeric divinyl-terminated aromatic ether-aromatic ketone-containing compounds may be converted to a thermoset or can be injected into a fiber-reinforced perform for the fabrication of complex shaped composite components. The thermosets (elastomers and plastics) or cured polymers may show outstanding and superior thermo-oxidative properties. The overall physical properties may be tailored by varying the diol or bisphenol reactant. Regardless of whether the cured polymer is an elastomer or a plastic, clear shaped films or solids are formed, which may be useful for electronic, electrical, and structural applications. By using a less reactive catalyst in the cure reaction, the viscosity of the polymerization system may be easily controlled for extended periods yielding a processing window, which may be advantageous for the fabrication of complex composite components and device coatings. Due to the thermal and oxidative stability of thermoset or network polymers cured to temperatures in excess of 350° C., the materials have potential for a variety of applications including the fabrication of advanced composite components (ship, aerospace, and marine) by conventional prepreg consolidation, RTM, injection molding, and filament winding and as a coating for electronic devices and for electrical insulator for high voltage cables. Due to the high char yield, the vinyl-based polymers of this invention may exhibit improvements in specific physical properties when used at high temperatures or in a fire environment. The thermoset may also be formulated with a material such as, but not limited to, carbon nanotubes, a clay, carbon nanofibers, a metal oxide, or microballoons. Microballoons are micron sized hollow glass beads.

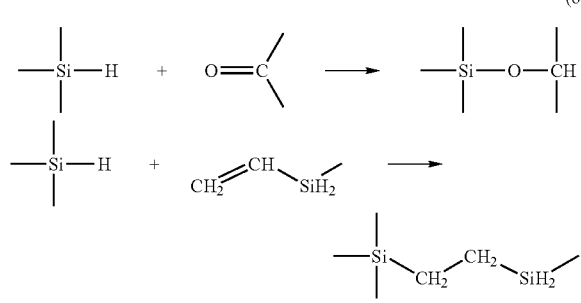

(8)

The flexible aromatic ether units may maintain processability (liquid) in the oligomeric divinyl-terminated aromatic ether-aromatic ketone-containing compounds and also contribute to high temperature stability of polymers due to their own inherent thermal stability. By controlling the ratio of reactants, different percentages of vinyl and aromatic ether-aromatic ketone units can be obtained in the resulting oligomeric compound. An ideal combination of reactants can be found to produce a polymer tailored for a particular application.

Having described the invention, the following examples are given to illustrate specific applications of the invention. These specific examples are not intended to limit the scope of the invention described in this application.

EXAMPLE 1

General Synthesis Method

The following method of making a 2:1 bisphenol A/benzophenone based hydroxyl terminated aromatic ether oligomer may generally be used for all the hydroxyl terminated aromatic ether oligomer syntheses by using appropriate diols and changing the reactant ratio. More details may be found in Keller et al., U.S. Pat. No. 7,087,707 (all referenced publications and patent documents are incorporated herein by reference). To a 250 mL three neck flask fitted with a thermometer, Dean-Stark trap with condenser, and nitrogen inlet is added bisphenol A (20.0 g, 87.6 mmol), 4,4'-difluorobenzophenone (9.56 g, 43.8 mmol), powdered $K_2CO_3$ (24.2 g, 175 mmol) and N,N-dimethylformamide (100 mL). After filling the Dean-Stark trap with toluene and adding 5 mL to the reaction flask, the mixture is heated to reflux at 145° C. The water formed in the reaction is removed by azeotropic distillation. The mixture is refluxed for 9-12 hr until no more water is observed being collected in the Dean-Stark trap. The remaining toluene is then removed by distillation and the reaction mixture cooled to ambient temperature. The reaction mixture is poured into 300 mL of a 10% NaOH solution. The aqueous solution is extracted with ether (2×100 mL) to remove impurities and the water layer made acidic by the addition of 100 mL of 2 M HCl solution. The resulting mixture is extracted again with ether (2×100 mL) and the ether layers combined. Carbon black (2 g) is added and the ether filtered through a short plug of silica gel to remove any insoluble components. The solvent is removed and the oil vacuum dried to yield the analytically pure 2:1 hydroxy terminated oligomer as a yellow crystalline solid.

EXAMPLE 2

Synthesis of 2:1 Oligomeric Vinyl Silane Terminated Resin Based on Bisphenol-A and 4,4'-difluorobenzophenone To a 100 mL three-necked flask fitted with a thermometer, a Dean-Stark trap with condenser, and a nitrogen inlet w ere added the 2:1 bisphenol A/benzophenone based hydroxyl terminated aromatic ether oligomer (10.0 g, 15.7 mmol), triethylamine (4.72 ml, 33.9 mmol) and anhydrous tetrahydrofuran (100 mL). The reaction mixture was cooled by means of an ice bath and vinyl(dimethylchloro)silane (4.68 ml, 33.1 mmol) was added dropwise. The resulting mixture was stirred for 1 h. The mixture was poured into water and extracted with diethyl ether. The solvent was removed in vacuo and the resulting oil dissolved in 1:1 methylene chloride:hexane and filtered through a silica plug. The solvent was removed in vacuo and the clear oil vacuum dried to yield the 2:1 oligomeric vinyl silane terminated resin (11.5 g, 91%). IR [$cm^{-1}$]: δ 3052 (C=CH), 2967 ($CH_3$), 1654 (C=O), 1593 (C=C), 1500 (aromatic), 1242 (C—O), 1171 (C—O), 834 (aromatic).

EXAMPLE 3

Catalytic Hydrosilylation Reaction with 2:1 Oligomeric Vinyl Silane Terminated Resin Based on Bisphenol-A and 4,4'-difluorobenzophenone and Tetrakis(dimethylsiloxy) Silane (2:1 Ratio, Slow Cure)

A mixture formulated from the 2:1 oligomeric vinyl silane terminated resin (0.36 g) of Example 2 and tetrakis(dimethylsiloxy)silane (0.07 mL) was dissolved in 1 mL of dry toluene. With stirring, a slow cure catalyst (7 μL of 2-2.5% platinum-cyclovinylmethylsiloxane complex in xylene solution) was added. The mixture was transferred to a silicone mold and was allowed to gel at room temperature (5 min). The sample was post cured above 100° C. to completely cure the resin. The result was a transparent elastomeric sample which had good thermal and oxidative stability and retained >40% weight after heating under air to 1000° C.

EXAMPLE 4

Catalytic Hydrosilylation Reaction with 2:1 Oligomeric Vinyl Silane Terminated Resin Based on Bisphenol-A and 4,4'-difluorobenzophenone and Bis[(p-dimethylsilyl)phenyl]ether (2.5:1 Ratio, Slow Cure)

A mixture formulated from the 2:1 oligomeric vinyl silane terminated resin (0.35 g) of Example 2 and bis[(p-dimethylsilyl)phenyl]ether (0.05 g) was dissolved in 1 mL of dry toluene. With stirring, a slow cure catalyst (7 μL of 2-2.5% platinum-cyclovinylmethylsiloxane complex in xylene solution) was added. The mixture was transferred to a silicone mold and was allowed to gel at room temperature (15 min). The sample was post cured above 1000° C. to completely Cure the resin. The result was a transparent elastomeric sample which had good thermal and oxidative stability and retained >40% weight after heating under air to 1000° C.

EXAMPLE 5

Catalytic Hydrosilylation Reaction with 2:1 Oligomeric Vinyl Silane Terminated Resin Based on Bisphenol-A and 4,4'-difluorobenzophenone and Diphenylsilane (1:1 Ratio, Rapid Cure)

A mixture formulated from the 2:1 oligomeric vinyl silane terminated resin (0.50 g) of Example 2 and diphenylsilane (0.11 g) was dissolved in 1 mL of dry toluene. With stirring, a rapid cure catalyst (10 μL of 2-2.5% platinum-vinylmethylsiloxane complex in xylene solution) was added. The mixture was transferred to a silicone mold and was allowed to gel at room temperature (5 min). The sample was post cured above 100° C. to completely cure the resin. The result was a transparent elastomeric sample which had good thermal and oxidative stability and retained >40% weight after heating under air to 1000° C.

EXAMPLE 6

Catalytic Hydrosilylation Reaction with 2:1 Oligomeric Vinyl Silane Terminated Resin Based on Bisphenol-A and 4,4'-difluorobenzophenone and 1,1,3,3,5,5,7,7-octamethyltetrasiloxane (1:1 Ratio, Rapid Cure)

A mixture formulated from the 2:1 oligomeric vinyl silane terminated resin (0.40 g) of Example 2 and 1,1,3,3,5,5,7,7-octamethyltetrasiloxane (0.14 g) was dissolved in 1 mL of dry toluene. With stirring, a rapid cure catalyst (20 μL of 2-2.5% platinum-vinylmethylsiloxane complex in xylene solution) was added. The mixture was transferred to a silicone mold and was allowed to gel at room temperature (5 min). The sample was post cured above 100° C. to completely cure the resin. The result was a transparent elastomeric sample which had good thermal and oxidative stability and retained >40% weight after heating under air to 1000° C.

EXAMPLE 7

Catalytic Hydrosilylation Reaction with 2:1 Oligomeric Vinyl Silane Terminated Resin Based on Bisphenol-A and 4,4'-difluorobenzophenone and Tetrakis(dimethylsiloxy) Silane (2.5:1 Ratio, Slow Cure)

A mixture formulated from the 2:1 oligomeric vinyl silane terminated resin (0.38 g) of Example 2 and tetrakis(dimethylsiloxy) silane (0.055 mL) was dissolved in 1 mL of dry toluene. With stirring, a slow cure catalyst (10 IL of 2-2.5% platinum-cyclovinylmethylsiloxane complex in xylene solution) was added. The mixture was transferred to a silicone mold and was allowed to gel at room temperature (15 min). The sample was post cured above 100° C. to completely cure the resin. The result was a transparent elastomeric sample which had good thermal and oxidative stability and retained >40% weight after heating under air to 1000° C.

EXAMPLE 8

Catalytic Hydrosilylation Reaction with 2:1 Oligomeric Vinyl Silane Terminated Resin Based on Bisphenol-A and 4,4'-difluorobenzophenone and Tetrakis(dimethylsiloxy) Silane (2.5:1 Ratio, Rapid Cure)

A mixture formulated from the 2:1 oligomeric vinyl silane terminated resin (0.38 g) of Example 2 and tetrakis(dimethylsiloxy) silane (0.055 mL) was dissolved in 1 mL of dry toluene. With stirring, a rapid cure catalyst (10 μL of 2-2.5% platinum-vinylmethylsiloxane complex in xylene solution) was added. The mixture was transferred to a silicone mold and was allowed to gel at room temperature (10 seconds). The sample was post cured above 100° C. to completely cure the resin. The result was a transparent elastomeric sample which had good thermal and oxidative stability and retained >40% weight after heating under air to 1000° C.

EXAMPLE 9

Catalytic Hydrosilylation Reaction with 2:1 Oligomeric Vinyl Silane Terminated Resin Based on Bisphenol-A and 4,4'-difluorobenzophenone and 1,1,3,3-tetramethyldisiloxane (2.5:1 Ratio, Rapid Cure)

A mixture formulated from the 2:1 oligomeric vinyl silane terminated resin (0.81 g) of Example 2 and 1,1,3,3-tetramethyldisiloxane (0.17 mL) was dissolved in 1 mL of dry toluene. With stirring, a rapid cure catalyst (25 μL of 2-2.5% platinum-vinylmethylsiloxane complex in xylene solution) was added. The mixture was transferred to a silicone mold and was allowed to gel at room temperature (1 min). The sample was post cured above 100° C. to completely cure the resin. The result was a transparent elastomeric sample which had good thermal and oxidative stability and retained >40% weight after heating under air to 1000° C.

EXAMPLE 10

Synthesis of 2:1 Oligomeric Vinyl Silane Terminated Resin Based on Bisphenol-A6F and 4,4'-difluorobenzophenone To a 100 mL three-necked flask fitted with a thermometer, a Dean-Stark trap with condenser, and a nitrogen inlet were added the 2:1 bisphenol A6F/benzophenone based hydroxyl terminated aromatic ether oligomer (10.0 g, 11.8 mmol), triethylamine (3.52 ml, 25.2 mmol) and anhydrous tetrahydrofuran (100 mL). The reaction mixture was cooled by means of an ice bath and vinyl(dimethylchloro)silane (3.50 ml, 24.7 mmol) added dropwise. The resulting mixture was stirred for 1 h. The mixture was poured into water and extracted with diethyl ether. The solvent was removed in vacuo and the resulting oil dissolved in 1:1 methylene chloride:hexane and filtered through a silica plug. The solvent was removed in vacuo and the clear oil vacuum dried to yield the 2:1 oligomeric vinyl silane terminated resin (11.0 g, 92%). IR [cm$^{-1}$]: δ 3051 (C=CH), 2968 (CH$_3$), 1654 (C=O), 1590 (C=C) 1501 (aromatic), 1242 (C—O), 1171 (C—O), 833 (aromatic).

EXAMPLE 11

Catalytic Hydrosilylation Reaction with 2:1 Oligomeric Vinyl Silane Terminated Resin Based on Bisphenol-A6F and 4,4'-difluorobenzophenone and Tetrakis(dimethylsiloxy)silane (3:1 Ratio, Rapid Cure)

A mixture formulated from the 2:1 oligomeric vinyl silane terminated resin (0.33 g) of Example 10 and tetrakis(dimethylsiloxy)silane (0.04 mL) was dissolved in 1 mL of dry toluene. With stirring, a rapid cure catalyst (8 μL of 2-2.5% platinum-vinylmethylsiloxane complex in xylene solution) was added. The mixture was transferred to a silicone mold and was allowed to gel at room temperature (10 seconds). The sample was post cured above 100° C. to completely cure the resin. The result was a transparent elastomeric sample which had good thermal and oxidative stability and retained >40% weight after heating under air to 1000° C.

EXAMPLE 12

Catalytic Hydrosilylation Reaction with 2:1 Oligomeric Vinyl Silane Terminated Resin Based on Bisphenol-A6F and 4,4'-difluorobenzophenone and Phenyl Tris(dimethylsiloxy)silane (1:1 Ratio, Rapid Cure)

A mixture formulated from the 2:1 oligomeric vinyl silane terminated resin (0.21 g) of Example 10 and phenyl tris(dimethylsiloxy)silane (0.09 mL) was dissolved in 1 mL of dry toluene. With stirring, a rapid cure catalyst (20 μL of 2-2.5% platinum-vinylmethylsiloxane complex in xylene solution) was added. The mixture was transferred to a silicone mold and was allowed to gel at room temperature (10 seconds). The sample was post cured above 100° C. to completely cure the resin. The result was a transparent elastomeric sample which had good thermal and oxidative stability and retained >40% weight after heating under air to 1000° C.

EXAMPLE 13

Catalytic Hydrosilylation Reaction with 2:1 Oligomeric Vinyl Silane Terminated Resin Based on Bisphenol-A6F and 4,4'-difluorobenzophenone and Methyl Tris(dimethylsiloxy)silane (2:1 Ratio, Rapid Cure)

A mixture formulated from the 2:1 oligomeric vinyl silane terminated resin (0.30 g) of Example 10 and methyl tris (dimethylsiloxy)silane (0.037 mL) was dissolved in 1 mL of dry toluene. With stirring, a rapid cure catalyst (10 μL of 2-2.5% platinum-vinylmethylsiloxane complex in xylene solution) was added. The mixture was transferred to a silicone mold and was allowed to gel at room temperature (5 seconds). The sample was post cured above 100° C. to completely cure the resin. The result was a transparent elastomeric sample which had good thermal and oxidative stability and retained >40% weight after heating under air to 1000° C.

EXAMPLE 14

Catalytic Hydrosilylation Reaction with 2:1 Oligomeric Vinyl Silane Terminated Resin Based on Bisphenol-A6F and 4,4'-difluorobenzophenone and Hydride Terminated Polydimethylsiloxane (1:2 Ratio, Rapid Cure)

A mixture formulated from the 2:1 oligomeric vinyl silane terminated resin (0.14 g) of Example 10 and hydride terminated polydimethylsiloxane (MW~450 g/mol) (0.16 g) was dissolved in 1 mL of dry toluene. With stirring, a rapid cure catalyst (15 μL of a 2-2.5% platinum-vinyl-methylsiloxane complex in xylene solution) was added. The mixture was transferred to a silicone mold and was allowed to gel at room temperature (1 minute). The sample was post cured above 100° C. to completely cure the resin. The result was a transparent elastomeric sample which had good thermal and oxidative stability and retained >40% weight after heating under air to 1000° C. and a glass transition temperature below 0° C.

EXAMPLE 15

Synthesis of 2:1 Oligomeric Vinyl Silane Terminated Resin Based on Resorcinol and 4,4'-difluorobenzophenone To a 100 mL three-necked flask fitted with a thermometer, a Dean-Stark trap with condenser, and a nitrogen inlet were added the 2:1 resorcinol/benzophenone based hydroxyl terminated aromatic ether oligomer (10.0 g, 25.1 mmol), triethylamine (7.52 ml, 54.0 mmol) and anhydrous tetrahydrofuran (200 mL). The reaction mixture was cooled by means of an ice bath and vinyl(dimethylchloro)silane (7.46 ml, 52.7 mmol) added dropwise. The resulting mixture was stirred for 1 h. The mixture was poured into water and extracted with diethyl ether. The solvent was removed in vacuo and the resulting oil dissolved in 1:1 methylene chloride:hexane and filtered through a silica plug. The solvent was removed in vacuo and the clear oil vacuum dried to yield the 2:1 oligomeric vinyl silane terminated resin (13.4 g, 94%). IR [cm$^{-1}$]:

δ 3052 (C═CH), 2970 (CH$_3$), 1655 (C═O), 1593 (C═C), 1503 (aromatic), 1241 (C—O), 1170 (C—O), 834 (aromatic).

EXAMPLE 16

Catalytic Hydrosilylation Reaction with 2:1 Oligomeric Vinyl Silane Terminated Resin Based on Resorcinol and 4,4'-difluorobenzophenone and Tetrakis(dimethylsiloxy)silane (2.5:1 Ratio, Rapid Cure)

A mixture formulated from the 2:1 oligomeric vinyl silane terminated resin (0.40 g) of Example 15 and tetrakis(dimethylsiloxy)silane (0.13 mL) was dissolved in 2 mL of dry toluene. With stirring, a rapid cure catalyst (25 μL of a 2-2.5% platinum-vinylmethylsiloxane complex in xylene solution) was added. The mixture was transferred to a silicone mold and was allowed to gel at room temperature (10 seconds). The sample was post cured above 100° C. to completely cure the resin. The result was a transparent elastomeric sample which had good thermal and oxidative stability and retained >40% weight after heating under air to 1000° C.

EXAMPLE 17

Formulation of Carbon Nanotube Compositions from a Catalytic Hydrosilylation Reaction of 2:1 Oligomeric Vinyl Silane Terminated Resin Based on Bisphenol-A and 4,4'-difluorobenzophenone and Tetrakis(dimethylsiloxy)silane (2:1 Ratio, Slow Cure)

A mixture formulated from the 2:1 oligomeric vinyl silane terminated resin (0.36 g) of Example 2 and tetrakis(dimethylsiloxy)silane (0.07 mL) was dissolved in 1 mL of dry toluene and various amounts of carbon nanotubes (0.01 to 20 weight %) were added with stirring. With continued stirring, a slow cure catalyst (10 μL of a 2-2.5% platinum-cyclovinylmethylsiloxane complex in xylene solution) was added. The mixture was transferred to a silicone mold and was allowed to gel at room temperature (5 minutes). The sample was post cured above 100° C. to completely cure the resin. The result was an opaque elastomeric sample which had good thermal and oxidative stability and retained >40% weight after heating under air to 1000° C.

EXAMPLE 18

Formulation of Clay Compositions from a Catalytic Hydrosilylation Reaction of 2:1 Oligomeric Vinyl Silane Terminated Resin Based on Bisphenol-A and 4,4'-difluorobenzophenone and Tetrakis(dimethylsiloxy)silane (2:1 Ratio, Rapid Cure)

A mixture formulated from the 2:1 oligomeric vinyl silane terminated resin (0.35 g) of Example 2 and tetrakis(dimethylsiloxy)silane (0.07 mL) was dissolved in 1 mL of dry toluene and various amount of clay (hydrated aluminum silicate; 0.01 to 20 weight %) were added with stirring. With continued stirring, a rapid cure catalyst (15 μL of a 2-2.5% platinum-vinylmethylsiloxane complex in xylene solution was added. The mixture was transferred to a silicone mold and was allowed to gel at room temperature (5 seconds). The sample was post cured above 100° C. to completely cure the resin. The result was an opaque elastomeric sample which had good thermal and oxidative stability and retained >40% weight after heating under air to 1000° C.

EXAMPLE 19

Formulation of Carbon Nanofiber Compositions from a Catalytic Hydrosilylation Reaction of 2:1 Oligomeric Vinyl Silane Terminated Resin Based on Bisphenol-A and 4,4'-difluorobenzophenone and Tetrakis(dimethylsiloxy)silane (2:1 Ratio, Slow Cure)

A mixture formulated from the 2:1 oligomeric vinyl silane terminated resin (0.40 g) of Example 2 and tetrakis(dimethylsiloxy)silane (0.10 mL) was dissolved in 1 mL of dry toluene and various amounts of carbon nanofibers (0.01 to 20 weight %) were added with stirring. With continued stirring, a slow cure catalyst (15 μL of a 2-2.5% platinum-cyclovinylmethylsiloxane complex in xylene solution) was added. The mixture was transferred to a silicone mold and was allowed to gel at room temperature (15 seconds). The sample was post cured above 100° C. to completely cure the resin. The result was an opaque elastomeric sample which had good thermal and oxidative stability and retained >40% weight after heating under air to 1000° C.

EXAMPLE 20

Formulation of a Metal Oxide Compositions from a Catalytic Hydrosilylation Reaction of 2:1 Oligomeric Vinyl Silane Terminated Resin Based on Bisphenol-A and 4,4'-difluorobenzophenone and Tetrakis(dimethylsiloxy)silane (2:1 Ratio, Rapid Cure)

A mixture formulated from the 2:1 oligomeric vinyl silane terminated resin (0.38 g) of Example 2 and tetrakis(dimethylsiloxy)silane (0.071 mL) was dissolved in 1 mL of dry toluene and various amount of powdered antimony oxide (0.01 to 20 weight %) were added with stirring. With continued stirring, a rapid cure catalyst (15 μL of a 2-2.5% platinum-vinylmethylsiloxane complex in xylene solution) was added. The mixture was transferred to a silicone mold and was allowed to gel at room temperature (5 seconds). The sample was post cured above 100° C. to completely cure the resin. The result was an opaque elastomeric sample which had good thermal and oxidative stability and retained >40% weight after heating under air to 1000° C.

EXAMPLE 21

Formulation of Microballoon Compositions from a Catalytic Hydrosilylation Reaction of 2:1 Oligomeric Vinyl Silane Terminated Resin Based on Bisphenol-A and 4,4'-difluorobenzophenone and Tetrakis(dimethylsiloxy)silane (2:1 Ratio, Rapid Cure)

A mixture formulated from the 2:1 oligomeric vinyl silane terminated resin (0.38 g) of Example 2 and tetrakis(dimethylsiloxy)silane (0.07 mL) was dissolved in 1 mL of dry toluene and various amount of microballoons (0.01 to 20 weight %) were added with stirring. With continued stirring, a rapid cure catalyst (50 μL of a 2-2.5% platinum-vinylmethylsiloxane complex in xylene solution) was added. The mixture was transferred to a silicone mold and was allowed to gel at room temperature (5 seconds). The sample was post cured above 100° C. to completely cure the resin. The result was an opaque elastomeric sample which had good thermal and oxidative stability and retained >40% weight after heating under air to 1000° C. and was less dense than Example 3.

EXAMPLE 22

Synthesis of 2:1 Oligomeric Vinyl Silane Terminated Resin Based on 4,4'-difluorobenzophenone (Excess) and Bisphenol-A To a 100 mL three-necked flask fitted with a thermometer, a Dean-Stark trap with condenser, and a nitrogen inlet were added the oligomeric product from the reaction of 2 moles of benzophenone and 1 mole of bisphenol A (3.44 g, 5.50 mmol), 4-vinyl(dimethylsilyl)phenol (2.06 g, 11.6 mmol) and potassium carbonate (5.00 g, 36.2 mmol) in 10 mL of DMF. The mixture was heated to 145° C. for 3 h. The mixture was cooled and poured into water and extracted with diethyl ether. The solvent was removed in vacuo and the resulting oil dissolved in 1:1 methylene chloride:hexane and filtered through a silica plug. The solvent was removed in vacuo and the clear oil vacuum dried to yield the 2:1 oligomeric vinyl silane terminated resin (4.16 g, 80%). IR [cm$^{-1}$]: δ3050 (C=CH), 2967 (CH$_3$), 1655 (C=O), 1593 (C=C), 1498 (aromatic), 1242 (C—O), 1171 (C—O), 834 (aromatic).

EXAMPLE 23

Catalytic Hydrosilylation Reaction with 2:1 Oligomeric Vinyl Silane Terminated Resin Based on 4,4'-difluorobenzophenone (Excess) and Bisphenol-A and Tetrakis(dimethylsiloxy)silane (2:1 Ratio, Slow Cure)

A mixture of 0.35 g of vinyl terminated oligomeric monomer from Example 22 and tetrakis(dimethylsiloxy)silane (0.07 mL) was dissolved in 1 mL of dry toluene. While stirring, a slow cure catalyst (30 µL of a 2-2.5% platinum-cyclovinylmethylsiloxane complex in xylene solution) was added. The mixture was transferred to a silicone mold and was allowed to gel at room temperature (15 min). The sample was post cured above 100° C. to completely cure the resin. The result was a transparent elastomeric sample which had good thermal and oxidative stability and retained >40% weight after heating under air to 1000° C.

EXAMPLE 24

Synthesis of 2:1 Vinyl Silane Terminated Resin Based on 4,4'-difluorobenzophenone To a 100 mL three-necked flask fitted with a thermometer, a Dean-Stark trap with condenser, and a nitrogen inlet were added the 4,4'-difluorobenzophenone (0.85 g, 3.90 mmol), 4-vinyl(dimethylsilyl)phenol (1.43 g, 8.00 mmol), and potassium carbonate (3.32 g, 24.0 mmol) in 5 mL of DMF. The mixture was heated to 130° C. for 16 h, cooled, poured into water, and extracted with diethyl ether. The solvent was removed in vacuo and the resulting oil dissolved in 1:1 methylene chloride:hexane and filtered through a silica plug. The solvent was removed in vacuo and the clear oil vacuum dried to yield the 2:1 oligomeric vinyl silane terminated resin (1.29 g, 61%). IR [cm$^{-1}$]: δ 3050 (C=CH), 2967 (CH$_3$), 1655 (C=O), 1593 (C=C), 1498 (aromatic), 1242 (C—O), 1171 (C—O), 834 (aromatic).

EXAMPLE 25

Catalytic Hydrosilylation Reaction from Reaction of Vinyl Silane Terminated Resin Based on 4,4'-difluorobenzophenone and 4-vinyl(dimethylsilyl)phenol Cured with Tetrakis(dimethylsiloxy)silane (2:1 Ratio, Rapid Cure)

A mixture of 0.20 g of Example 24 and tetrakis(dimethylsiloxy)silane (0.07 mL) was dissolved in 2 mL of dry toluene. While stirring, a rapid cure catalyst (20 µL of a 2-2.5% platinum-vinylmethylsiloxane complex in xylene solution) was added. The mixture was transferred to a silicone mold and was allowed to gel at room temperature (15 sec). The sample was post cured above 100° C. to completely cure the resin. The result was a transparent elastomeric sample which had good thermal and oxidative stability and retained >40% weight after heating under air to 1000° C.

EXAMPLE 26

Synthesis of 2:1 Oligomeric Vinyl Silane Terminated Resin Based on Biphenol and 4,4'-difluorobenzophenone To a 100 mL three-necked flask fitted with a thermometer, a Dean-Stark trap with condenser, and a nitrogen inlet were added the 2:1 biphenyl/benzophenone based hydroxyl terminated aromatic ether oligomer (10.0 g, 18.2 mmol), triethylamine (5.70 ml, 41.2 mmol), and anhydrous tetrahydrofuran (100 mL). The reaction mixture was cooled by means of an ice bath and vinyl(dimethylchloro)silane (5.66 ml, 40.0 mmol) added dropwise. The resulting mixture was stirred for 1 h. The mixture was poured into water and extracted with diethyl ether. The solvent was removed in vacuo and the resulting oil dissolved in 1:1 methylene chloride:hexane and filtered through a silica plug. The solvent was removed in vacuo and the clear oil vacuum dried to yield the 2:1 oligomeric vinyl silane terminated resin (12.1 g, 92%). IR [cm$^{-1}$]: δ 3051 (C=CH), 2968 (CH$_3$), 1654 (C=O), 1590 (C=C), 1501 (aromatic), 1242 (C—O), 1171 (C—O), 833 (aromatic).

EXAMPLE 27

Catalytic Hydrosilylation Reaction with 2:1 Oligomeric Vinyl Silane Terminated Resin Based on Biphenol and 4,4'-difluorobenzophenone and Tetrakis(dimethylsiloxy)silane (3:1 Ratio, Rapid Cure)

A mixture formulated from the 2:1 oligomeric vinyl silane terminated resin (0.35 g) of example 26 and tetrakis(dimethylsiloxy)silane (0.05 mL) was dissolved in 1 mL of dry toluene. With stirring, a rapid cure catalyst (6 µL of 2-2.5% platinum-vinylmethylsiloxane complex in xylene solution) was added. The mixture was transferred to a silicone mold and was allowed to gel at room temperature (10 seconds). The sample was post cured above 100° C. to completely cure the resin. The result was a transparent elastomeric sample which had good thermal and oxidative stability and retained >40% weight after heating under air to 1000° C.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A compound having the formula:

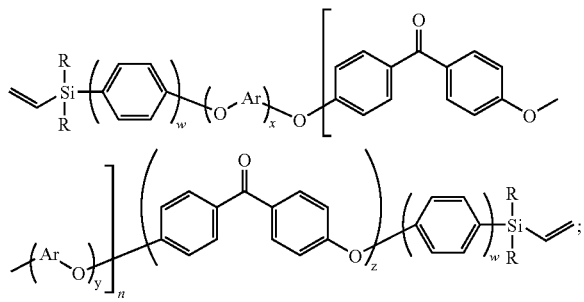

wherein each Ar is an independently selected aromatic group;
wherein each R is an independently selected alkyl group;
wherein n is a positive integer;
wherein w is 0 or 1;
wherein x is 0 or 1;
wherein y is 0 or 1;
wherein z is 0 or 1;
wherein if y is 0 than x and z are 0 and w is 1;
wherein if y is 1 than x and z have different values and w equals z.

2. The compound of claim 1, wherein the compound has the formula:

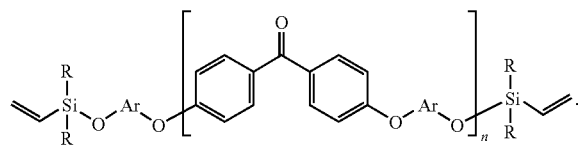

3. The compound of claim 1, wherein the compound has the formula:

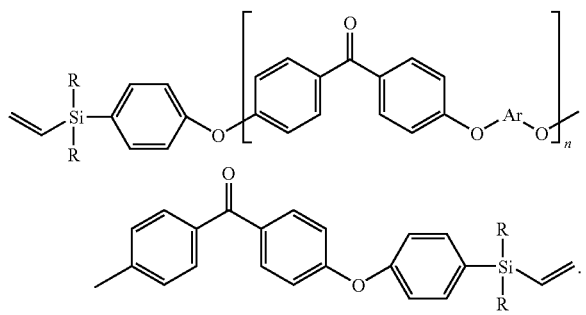

4. The compound of claim 1, wherein the compound has the formula:

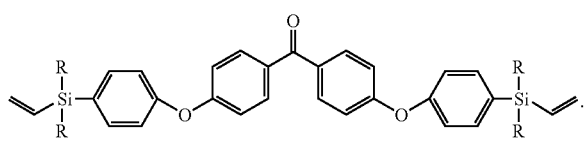

5. The compound of claim 1, wherein every Ar is a residue of 4,4'-dihydroxy-2,2-diphenylpropane; 1,1,1,3,3,3-hexafluoro-4,4'-dihydroxy-2,2-diphenylpropane; biphenol; or resorcinol.

6. A method comprising:
reacting 4,4'-difluorobenzophenone with an aromatic diol to form an oligomer; and
reacting the oligomer with a vinyl dialkylsilane to form a compound having the formula:

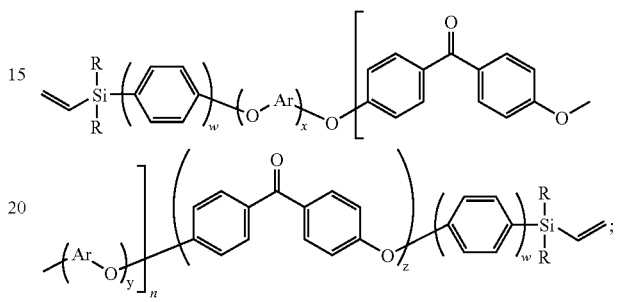

wherein each Ar is an independently selected aromatic group;
wherein each R is an independently selected alkyl group;
wherein n is a positive integer;
wherein w is 0 or 1;
wherein x is 0 or 1;
wherein z is 0 or 1; and
wherein x and z have different values and w equals z.

7. The method of claim 6;
wherein the aromatic diol is present in a stoichiometric excess relative to the 4,4'-difluorobenzophenone;
wherein the vinyl dialkylsilane is a vinyl(dialkylchloro)silane; and
wherein the compound has the formula:

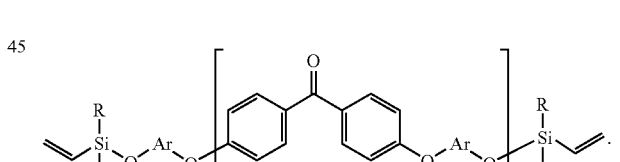

8. The method of claim 6;
wherein the 4,4'-difluorobenzophenone is present in a stoichiometric excess relative to the aromatic diol;
wherein the vinyl dialkylsilane is a vinyl(dialkylsilyl)phenol; and
wherein the compound has the formula:

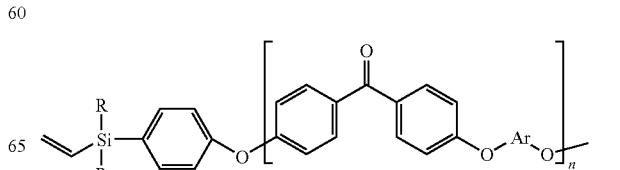

-continued

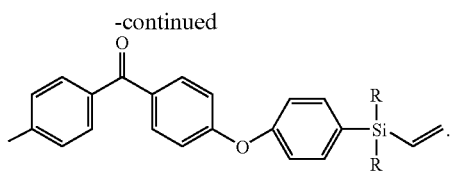

9. The method of claim 6, wherein every Ar is a residue of 4,4'-dihydroxy-2,2-diphenylpropane; 1,1,1,3,3,3-hexafluoro-4,4'-dihydroxy-2,2-diphenylpropane; biphenol; or resorcinol.

10. The method of claim 6, further comprising:
crosslinking a silane-containing compound with the compound.

11. The method of claim 10, wherein the silane-containing compound is tetrakis(dimethylsiloxy)silane; methyl tris(dimethylsiloxy)silane; phenyl tris(dimethylsiloxy)silane; bis[(p-dimethylsilyl)phenyl]ether; diphenylsilane; 1,1,3,3-tetramethyldisiloxane; 1,1,3,3,5,5,7,7-octamethyltetrasiloxane; or hydride-terminated polydimethylsiloxane.

12. The method of claim 10, wherein the crosslinking occurs both between silane groups and ketone groups and between silane groups and vinyl groups.

13. The method of claim 10, further comprising:
combining the silane-containing compound and the compound with carbon nanotubes, a clay, carbon nanofibers, a metal oxide, or microballoons.

14. A method comprising:
reacting 4,4'-difluorobenzophenone with a vinyl(dialkylsilyl)phenol to form a compound having the formula:

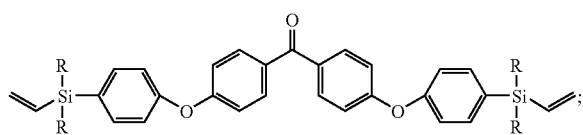

wherein each R is an independently selected alkyl group.

15. The method of claim 14, further comprising:
crosslinking a silane-containing compound with the compound.

16. The method of claim 15, wherein the silane-containing compound is tetrakis(dimethylsiloxy)silane; methyl tris(dimethylsiloxy)silane; phenyl tris(dimethylsiloxy)silane; bis[(p-dimethylsilyl)phenyl]ether; diphenylsilane; 1,1,3,3-tetramethyldisiloxane; 1,1,3,3,5,5,7,7-octamethyltetrasiloxane; or hydride-terminated polydimethylsiloxane.

17. The method of claim 15, wherein the crosslinking occurs both between silane groups and ketone groups and between silane groups and vinyl groups.

18. The method of claim 15, further comprising:
combining the silane-containing compound and the compound with carbon nanotubes, a clay, carbon nanofibers, a metal oxide, or microballoons.

* * * * *